United States Patent [19]
Miller

[11] Patent Number: 6,000,707
[45] Date of Patent: Dec. 14, 1999

[54] LINEAR DRIVING APPARATUS

[75] Inventor: Donald C. Miller, Fallbrook, Calif.

[73] Assignee: Linear Bicycles, Inc., Fallbrook, Calif.

[21] Appl. No.: 09/109,362

[22] Filed: Jul. 2, 1998

Related U.S. Application Data

[60] Provisional application No. 60/056,045, Sep. 2, 1997, provisional application No. 60/062,860, Oct. 16, 1997, provisional application No. 60/062,620, Oct. 22, 1997, and provisional application No. 60/070,044, Dec. 30, 1997.

[51] Int. Cl.$^6$ .................................................. B62K 3/00
[52] U.S. Cl. ........................ 280/288.1; 280/251; 280/252
[58] Field of Search ............................... 280/288.1, 252, 280/251

[56] References Cited

U.S. PATENT DOCUMENTS

| | | |
|---|---|---|
| 1,500,809 | 7/1924 | Giufri . |
| 3,661,404 | 5/1972 | Bossaer . |
| 3,891,235 | 6/1975 | Shelly . |
| 3,954,282 | 5/1976 | Hege . |
| 4,169,609 | 10/1979 | Zampedro . |
| 4,227,712 | 10/1980 | Dick . |
| 4,574,649 | 3/1986 | Seol . |
| 4,630,539 | 12/1986 | Seol . |
| 5,125,677 | 6/1992 | Ogilvie et al. ............................ 280/252 |
| 5,156,412 | 10/1992 | Meguerditchian . |
| 5,236,211 | 8/1993 | Meguerditchian . |
| 5,451,070 | 9/1995 | Lindsay et al. ............................ 280/252 |
| 5,496,051 | 3/1996 | Farmos . |
| 5,601,301 | 2/1997 | Liu ........................................... 280/252 |
| 5,690,346 | 11/1997 | Keskitalo ................................. 280/252 |

*Primary Examiner*—Lanna Mai
*Assistant Examiner*—William R. Zimmerli
*Attorney, Agent, or Firm*—Knobbe, Martens, Olson & Bear LLP

[57] ABSTRACT

An apparatus for linearly driving a vehicle or machine. The apparatus includes a frame, at least one drive wheel, and at least one rotatable driver comprising a pulley or a sprocket, rotatably mounted with respect to the frame. Further, the system includes a flexible, elongated power transmitter comprising a belt, a chain, or a cable, the transmitter being mounted for reciprocating linear motion with respect to the frame and passing around and engaging the rotatable driver to rotate the driver in at least a first rotational direction. The apparatus also has a first and second pedal to engage the power transmitter in a first and second direction. The first and second pedals are mounted to the frame in a manner that permits only non-arcuate, linear reciprocating motion of the pedals with respect to the frame. The second pedal is connected to the first pedal such that motion of the first pedal in a first linear direction causes the second pedal in an opposite, second linear direction, and the motion of the first pedal in the second linear direction causes motion of the second pedal in the first linear direction.

36 Claims, 10 Drawing Sheets

LINEAR DRIVING APPARATUS

RELATED APPLICATIONS

Applicant hereby claims priority to the following applications: U.S. Provisional Patent Application No. 60/056,045, filed on Sep. 2, 1997; U.S. Provisional Patent Application No. 60/062,860, filed on Oct. 16, 1997; U.S. Provisional Patent Application No. 60/062,620, filed on Oct. 22, 1997; U.S. Provisional Patent Application No. 60/070,044, filed on Dec. 30, 1997.

BACKGROUND OF THE INVENTION

1. Field of the Invention

The invention pertains to the field of an apparatus for powering a human-powered machine. More particularly, the invention pertains to a linear driving mechanism suitable for a bicycle.

2. Description of the Related Art

Conventional bicycles are mostly driven by circular motion of crank pedals. However, only a small portion of the 360° rotation of the crank is used to propel the bicycle; the rest is rotary motion and is wasted. Rotary crank pedals do not provide a uniform effective conversion of the substantially linear driving force exerted by a rider into drive torque. Thus, a rider expends excessive energy and fatigues more quickly. Since the pedal stroke of circular crank pedals cannot be adjusted, and a full turn of the crank pedal is inevitably required to drive the conventional bicycle, the rider's legs and stroke pattern do not always fit with the crank's pedal circular motion stroke.

Although lever propelled bicycles, propelled by up and down arcuate motion levers have been proposed, the mechanisms used for transmitting the motion of energy of the levers to a drive wheel has not been satisfactory. Since a majority of these solutions do not provide a true linear drive mechanism, they do not provide a 100% efficiency in the stroke. Furthermore, these solutions have failed to provide a mechanism by which an individual can power a vehicle on a backward and forward stroke.

Therefore, bicyclists and bicycle manufacturers are in need of a linear drive system which provides true linear driving capabilities as well as the capability to drive the bicycle upon an upward and backward stroke of the pedals.

SUMMARY OF THE INVENTION

The invention is a human powered vehicle or machine and it generally comprises a frame supporting a rider, a driven wheel rotatably mounted on the frame, a rotatable driver for driving the driven wheel, left and right pedals mounted on the frame, the pedals reciprocally traveling in a substantially rectilinear path, and a power transmitter for converting the rectilinear motion of the pedals into rotary motion for propelling the driven wheel.

One version of the invention includes a vehicle or machine powered by a rider, comprising a frame, at least one drive wheel, at least one rotatable driver comprising a pulley or a sprocket, rotatably mounted with respect to the frame, which engages with the drive wheel to rotate the drive wheel, a flexible, elongated power transmitter comprising a belt, a chain, or a cable, said transmitter being mounted for reciprocating linear motion with respect to the frame and passing around and engaging the rotatable driver to rotate the driver in at least a first rotational direction, said power transmitter having a first portion and a second portion, a first pedal fixedly engaging the first portion of the power transmitter, and a second pedal fixedly engaging the second portion of the power transmitter, said first and second pedals being mounted to the frame in a manner that permits only non-arcuate, linear reciprocating motion of said pedals with respect to said frame, said second pedal connected to the first pedal such that motion of the first pedal in a first linear direction causes the second pedal in an opposite, second linear direction, and the motion of the first pedal in the second linear direction causes motion of the second pedal in the first linear direction, whereby linear motion of said pedals causes said power transmitter to rotate said rotatable driver and said drive wheel.

Yet another version of the invention includes a drive system for a human-powered vehicle or machine, comprising: a linear track, a pair of pedals mounted for linear reciprocating motion along said track, a linkage between said pedals such that upon linear motion of one pedal in one direction the other pedal moves in the opposite direction, and vice versa, a power transmitter comprising a belt, a cable, or a roller chain, said power transmitter having a first portion fixedly connected to said first pedal and a second portion fixedly connected to said second pedal, said power transmitter mounted for reciprocating movement, at least one rotatable driver comprising a pulley or a sprocket coupled to said power transmitter such that movement of said power transmitter rotates said driver, and first and second one way clutches, each coupled to one said rotatable driver, and a drive wheel coupled to said roller clutches, such that upon movement of said power transmitter in a first direction, said first roller clutch engages to rotate said drive wheel in a predetermined direction, and upon movement of said power transmitter in a second direction, said second roller clutch engages to rotate said drive wheel in said same predetermined direction.

DETAILED DESCRIPTION OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

Figure 1:
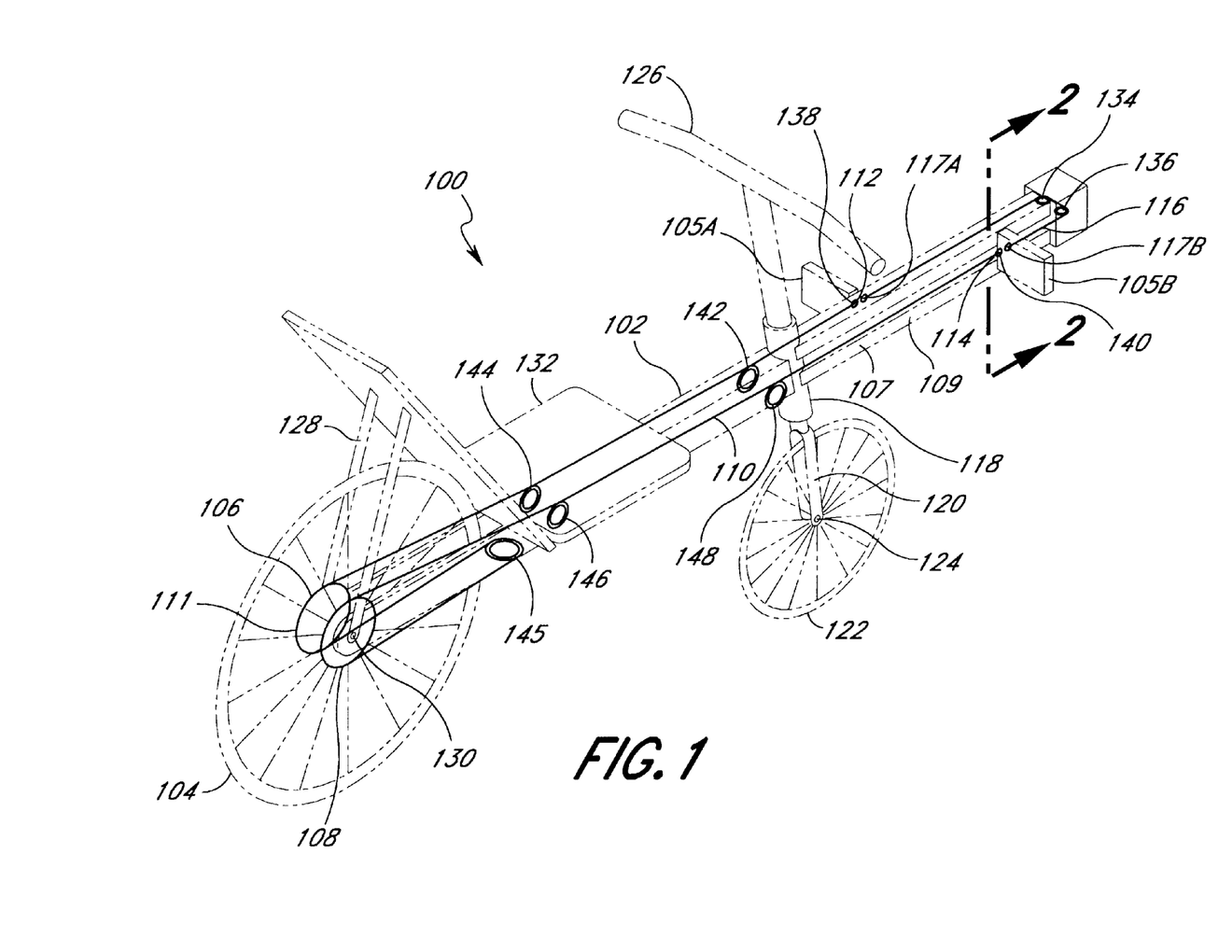
FIG. 1 is a perspective view of a vehicle employing a drive mechanism using linear tracks to provide a rear wheel drive.

Referring to FIG. 1, a first preferred embodiment of a linear drive transmission which is used in a vehicle 100, such as a bicycle, is illustrated. FIG. 1 is a perspective view of the vehicle 100. The vehicle 100 may generally include a frame 102, a drive wheel, such as a rear wheel 104, left and right pedals 105A, 105B, and two linear tracks 107. Although a bicycle is shown, it will be appreciated that, in its broadest form, the principles of the invention are applicable to other vehicles having a driven wheel, such as any vehicle having one or more driven wheels, and one, two, three, four or more total wheels.

In one embodiment, the frame 102 may be constructed of suitable strong materials as are well-known in the bicycle art, such as aluminum or steel or their alloys or glass or carbon graphite fibers. One embodiment of the frame 102 may generally include a front bearing or fork tube 118 in which is journaled a front fork assembly 120. The front fork assembly 120 includes at its upper end a journal or steerer rotatably mounted in the fork tube 118. A front wheel 122 is rotatably mounted, such as on a front axle 124, to the lower end of the front fork assembly 120. Two handlebars 126 are attached to the upper end of the front fork assembly 120 for rotating the front fork assembly 120 and front wheel 122 about the axis of the fork tube 118, thereby steering the vehicle 100. The frame 102 includes at least one down tube member, such as down tubes 128, having at its rear end a wheel mount 130 for mounting a rear wheel axle and the rear wheel 104. Other frame arrangements, including conventional-style bicycle or tricycle frames are also contemplated.

The frame 102 includes a seat 132 for comfortably supporting a rider. Preferably, the seat 132 is padded and easily adjustable to accommodate the rider. The seat 132 can be mounted in front of the rear wheel 104, as illustrated, or may be more conventionally located above the wheels. The linear tracks 107 are mounted in a desired location, such as on each side of a forward portion 109 of the frame 102. The forward portion 109 of the frame 102 extends from a forward side of the fork tube 118. The linear tracks 107 guide the left and right pedals 105A, 105B to travel in a rectilinear motion. The connections between the pedals 105A, 105B and the linear tracks 107 are described in greater detail in reference to FIGS. 2 and 3. Further, the embodiment of the invention disclosed in FIG. 1, illustrates the linear tracks 107 in a substantially horizontal position in relation to a ground plane. However, as will be discussed in greater detail in reference to FIG. 5, other positions may be used.

A flexible elongated linkage 116 is connected at a first end 117A to the left pedal and at a second end 117B to the right pedal 105B. In one embodiment of the invention, the linkage 116 is routed around a first linkage pulley 134 and a second linkage pulley 136. The first and second linkage pulleys 134, 136 are located on a first and second side of a forward end of the frame 102, respectively. In one embodiment of the invention, the first and second linkage pulleys may be substituted with a single pulley. The linkage 116 may comprise a belt, a chain, or a cable. Further, if the linkage 116 is a belt, the belt may cogged. A cable is preferred.

A power transmitter 110 is provided to transmit power from the pedals to the drive wheel. The power transmitter 110 can advantageously be a belt, a chain (such as a roller chain) or a cable. The belt can be of any design capable of transmitting power, including a "V" belt and a cogged belt such as the belt material typically used for automotive timing chains. The power transmitter 110 includes a drive portion and two pedal connection portions 112, 114. At the pedal connection portions 112, 114, the power transmitter 110 is mounted for reciprocating linear motion with respect to the frame 102. The drive portion and the at least two pedal connection portions 112, 114 may constitute different portions of a single belt or may be two or more belts each connected to pedals 105A and 105B. In one embodiment of the invention, each of the two pedal connection portions 112, 114 are respectively located proximate to a first and second end 138, 140 of the power transmitter 110. Further, each of the pedal connection portions 112, 114 are located on the first and second side of the vehicle 100, respectively. From the left pedal 105A, the power transmitter 110 extends to a pulley 142 which is located proximate to the fork tube 118, and then across to a pulley 144 which is located underneath the seat 132. The pulley 144 guides the power transmitter 110 around the first rotatable driver 106 which is rotatably mounted to the wheel mount 130. From the first rotatable driver 106, the power transmitter 110 extends around a pulley 145 which is centrally positioned along the frame axis and directly in front of the rear wheel 104. The pulley 145 is used to guide the power transmitter 110 around the rear wheel 104. From the pulley 145, the power transmitter 110 extends around a second rotatable driver 108 on a second side of the vehicle. Similar to the first rotatable driver 108, the second rotatable driver 108 is rotatably mounted to the wheel mount 130. Each of the first and second rotatable drivers 106, 108 are rotatably engaged by the drive portion 111 of the power transmitter 110. From the second rotatable driver 106, the power transmitter 110 extends over a pulley 146 which is situated on a side of the frame 102 opposite the pulley 144 and underneath the seat 132. The power transmitter 110 then extends over a pulley 148 which sits on a side of the frame 102 opposite the pulley 142. The power transmitter 110 then connects to the right pedal 105A proximate to the second end 140 of the power transmitter 110. Together the power transmitter 110 and the linkage 116 provide a closed loop. It is noted, the power transmitter 110 and the linkage 116 may be separate or may together comprise a single member.

It is also noted that the number and location of the pulleys used to guide the power transmitter 110 may be varied. For example, a different pulley configuration may be used to route the power transmitter 110 across different parts of the vehicle 100 depending on the selected frame 102 of the vehicle 100. Exemplary, non-limiting alternative pulley configurations are described in reference to alternative embodiments of the invention, such as are shown in FIGS. 4, 5, 6, 8, and 11.

The first rotatable driver 106 and the second rotatable driver 108 may each include a pulley or sprocket which is rotatably mounted with respect to the frame 102. The first and second rotatable drivers 106, 108 each engage the rear wheel 104. In one embodiment of the invention, the first rotatable driver 106 and the second rotatable driver 108 each include a one way clutch which rotationally couples its respective rotatable driver to the rear wheel 104.

The first rotatable driver 106 is adapted to engage when the power transmitter 110 moves in a first direction, and the second rotatable driver 108 is adapted to engage when said power transmitter 110 moves in a second direction opposite to the first direction. The power transmitter 110 connects pedals 105A and 105B to drive the first and second rotatable drivers 106, 108 such that rearward movement of the left pedal 105A activates or engages the second rotatable driver 108. while the linkage 116 moves the right pedal 105B forward. Similarly, the rearward movement of right pedal 105B rotates or activates the first rotatable driver 106, while the linkage 116 moves the left pedal 105A forward. It is to be appreciated that the activation direction of each of the first rotatable driver and the second rotatable drivers may be switched, so the rearward movement of the right pedal 105B engages the second rotatable driver 108, and the rearward movement of the left pedal 105A engages the first rotatable driver 106.

The first rotatable driver 106 and the second rotatable driver 108 may optionally have teeth to engage the power transmitter 110, such as sprocket teeth or cogs that engage a roller chain or a cogged belt.

Figure 2:
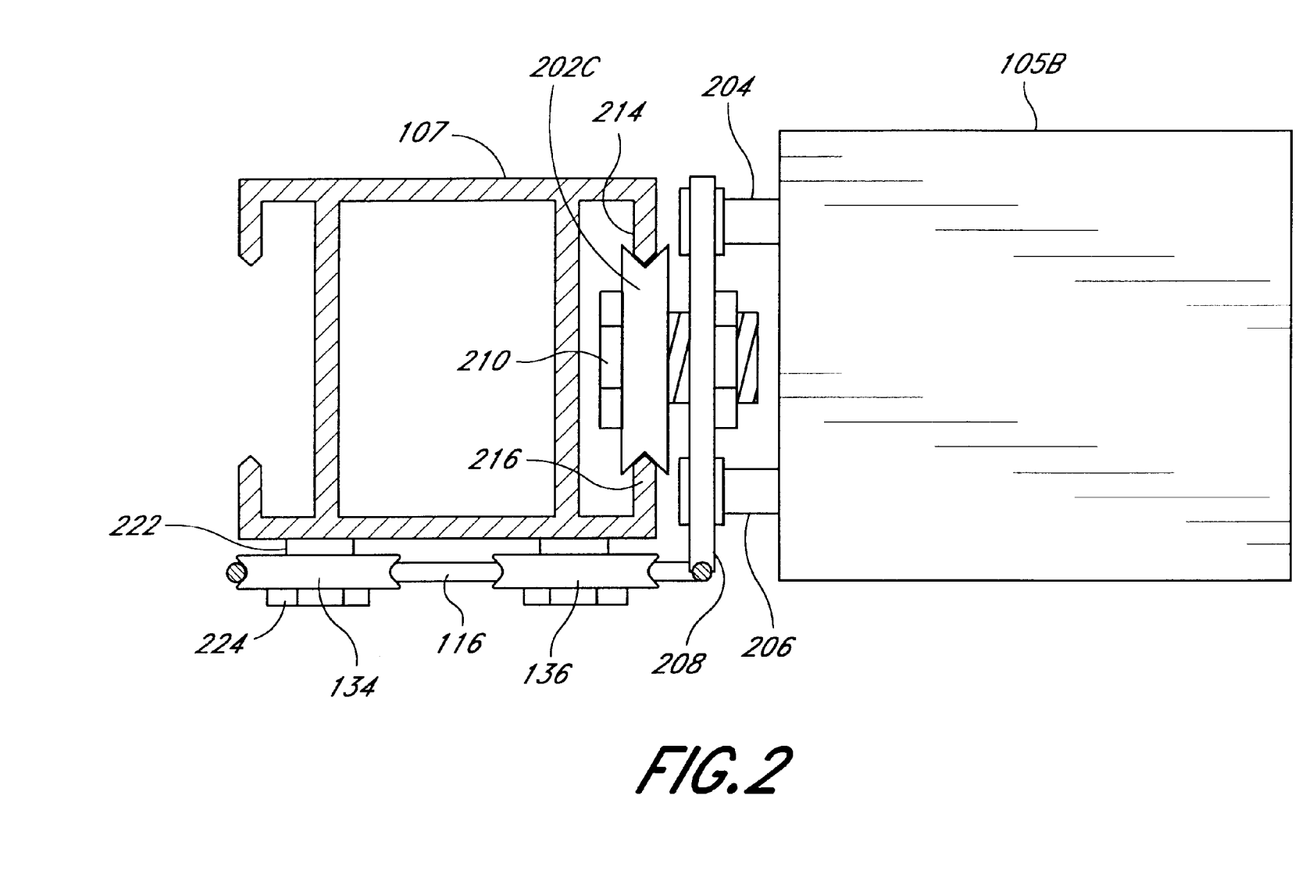
FIG. 2 is a cutaway rear elevational view along the lines 1—1 of the linear tracks shown in FIG. 1.
Figure 3:
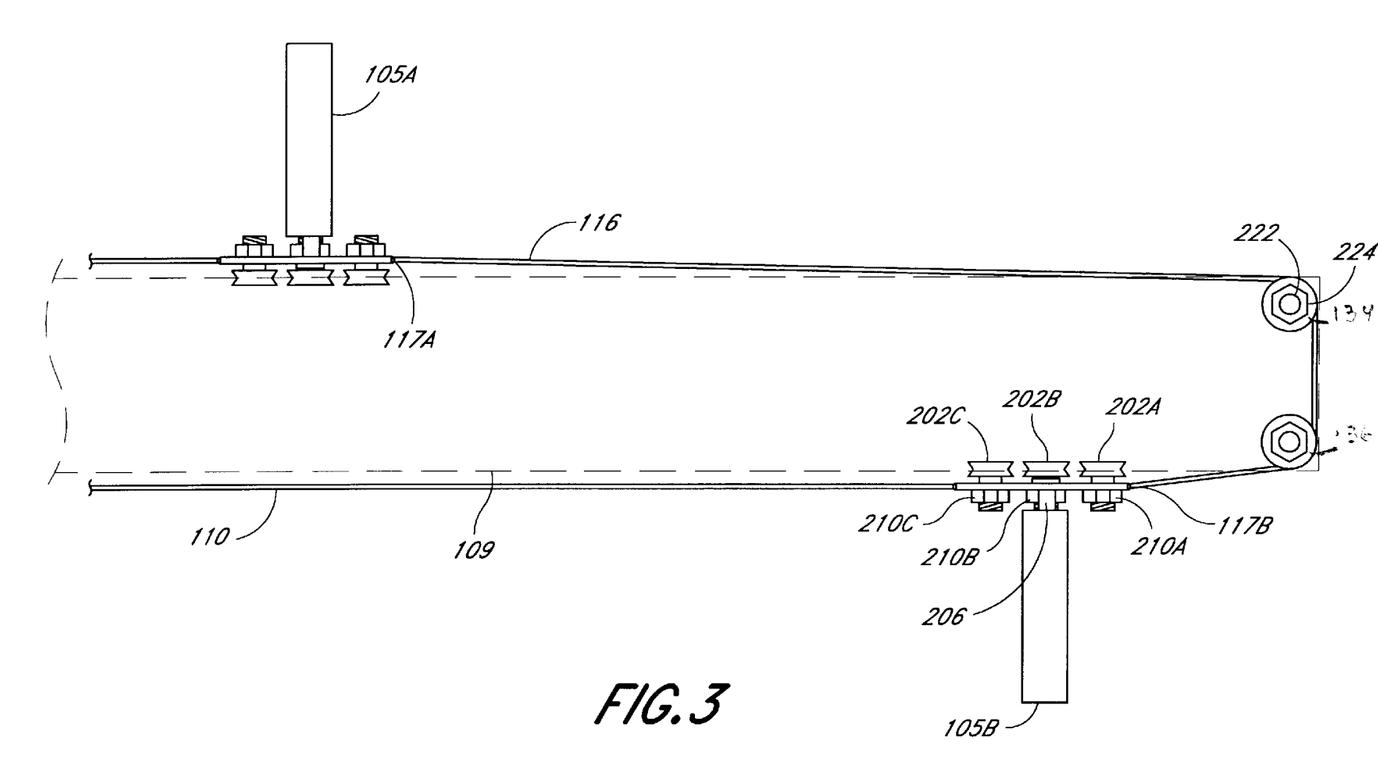
FIG. 3 is a top plan view of the linear tracks of the vehicle shown in FIG. 1.

Referring now to FIG. 2 and FIG. 3, the means for connecting the left and right pedals 105A, 105B to the linear tracks 107 are illustrated. FIG. 2 is a rear elevational view of the right pedal 105B shown in FIG. 1. FIG. 3 is a top plan view of the pedal assembly shown in FIG. 1. Although the connection between the right pedal 105B and the frame 102 is described in detail in reference to FIG. 2, a similar connection is employed in reference to the left pedal 105A and the frame 102.

It will be appreciated that the illustrated pedal and track mechanism is exemplary only, and numerous mechanical equivalents and variations will be apparent to those of skill in the art. In the illustrated embodiment, the right pedal 105B may be attached to one of the linear tracks 107 by multiple rollers 202A, 202B, and 202C. Each of the linear tracks 107 can provide two guide rails 214, 216 (FIG. 2) to support the multiple rollers 202A, 202B, and 202C. In another embodiment of the invention, each of the linear tracks 107 houses four rollers. However, it is to be appreciated that fewer or more rollers may be used to engage each of the pedals 105A, 105B to the linear tracks 107. The right pedal 105B is mounted on two posts 204 and 206. The two posts 204, 206 are rotatably connected to a pedal support member 208 and extend orthogonal from a surface of the pedal support member 208 which is distal to the frame 102. The pedal support member 208 has at least one aperture (not shown) for the purpose of receiving roller bolts 210A, 210B, and 210C. The roller bolts 210A, 210B, 210C respectively connect the pedal support member 208 to one of multiple rollers 202A, 202B, 202C.

The second end 117B of the linkage 116 may be connected to the pedal support member 208. As discussed above, the linkage 116 causes, upon the movement of one of the two pedals 105A, 105B in a first direction, the movement of the other pedal in an opposite direction. Also connected to the rear of the pedal support member 208 is the power transmitter 110 (FIG. 3). In one embodiment, the pedals 105A, 105B may use toe clips or may use a standard clipless mechanism (not shown) wherein the rider's standard cycling shoes snap into the pedal 105A, 105B. FIGS. 2 and 3 also further illustrate that each of the linkage pulleys 134, 136 are rotatably mounted to the frame 102 by a pulley bolt 222 and a pulley nut 224.

Figure 4:
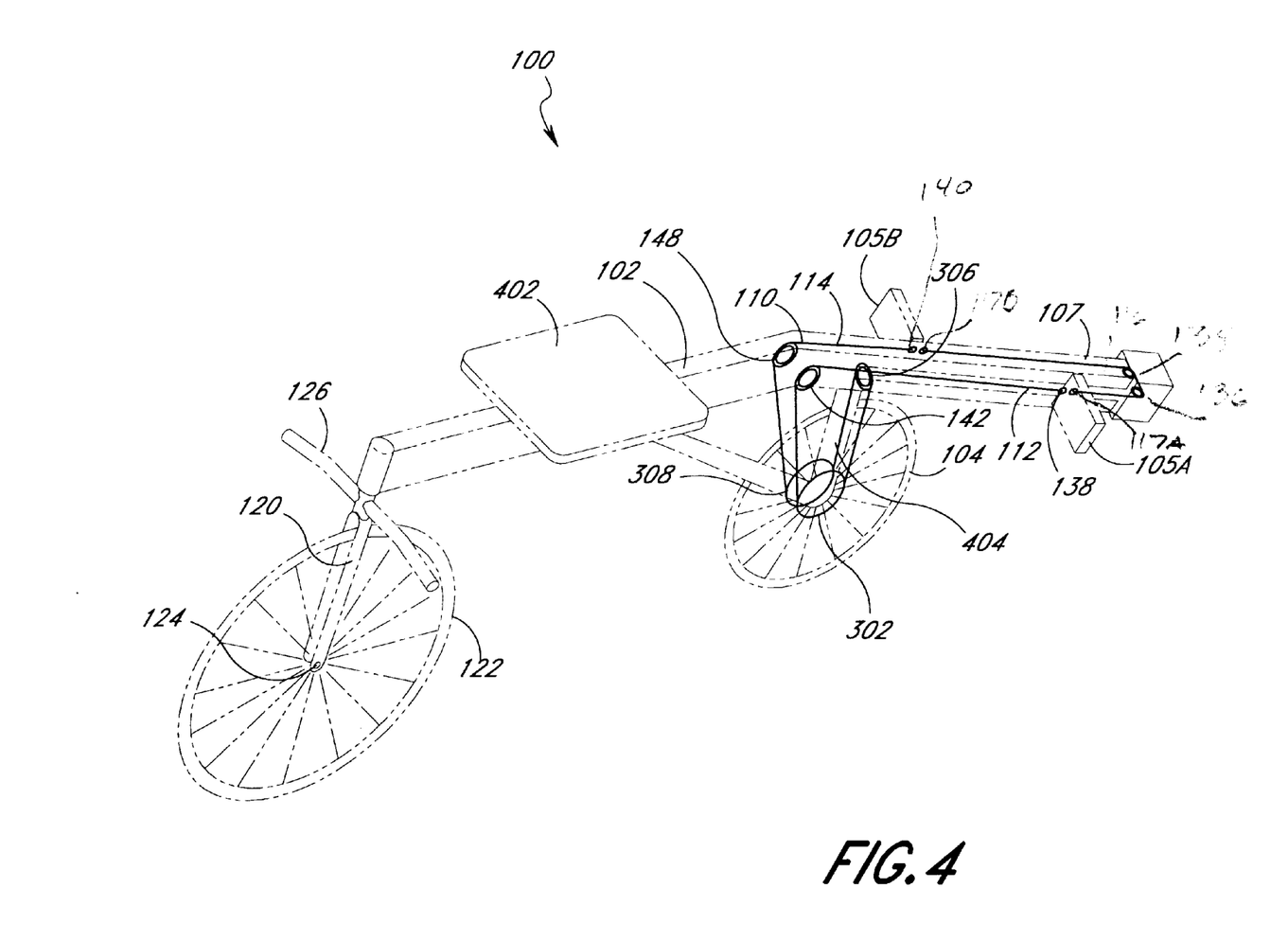
FIG. 4 is perspective view of an alternative embodiment of the invention wherein the vehicle can be ridden by a rider who is resting his chest on a chest rest.

Now referring to FIG. 4, an alternative embodiment of the invention is disclosed. For purposes of simplicity, only the differences between the embodiment of the invention shown in FIG. 1 and FIG. 4 are described. The vehicle 100 includes a chest rest 402 for support the chest of a rider (not shown). The chest rest 402 may be contoured to support the rider's chest. Further, as shown, the chest rest 402 may be in a fixed position on the frame 102 or, the chest rest 402 may be slidably mounted with a mount assembly (not shown) to the remainder of the frame 102. Similar to the embodiment illustrated in FIG. 1, the vehicle 100 has linear tracks 107 positioned at an approximately 45 degree angle in reference to a ground plane.

Each of the ends 138, 140 of the power transmitter 110 is connected to one of the pedals 105A, 105B. From the pedal 105A, the power transmitter 110 extends to the pulley 142. The pulley 142 guides the power transmitter 110 in a downward direction to a first rotatable driver 302 mounted on a bottom end of a rear wheel support member 404. From the first rotatable driver 302, the power transmitter 110 extends upward and around a pulley 306 which is mounted on a rear side of the rear wheel support member 404. The power transmitter 110 then extends downward to a second rotatable driver 308, the second rotatable driver 308 being mounted on the bottom end of the rear wheel support member 404. From the second rotatable driver 308, the power transmitter 110 extends around the pulley 148 and finally connects to the right pedal 105B.

In one embodiment of the invention, the first rotatable driver 302 and the second rotatable driver 308 each include a one way clutch. The one way clutch may be implemented by using a roller clutch, a pawl and ratchet, a freewheel, or any other conventional drive mechanism that engages in one rotational direction but not the other.

The movement of the power transmitter 110 (FIG. 4) in the first direction engages the first rotatable driver 302 to drive the rear wheel 104 in a forward direction. The movement of the power transmitter 110 in the second direction engages the second rotatable driver 308 to drive the rear wheel 104 in a forward direction. Further, each of the pedals are linked such that the movement of one of the pedals 105A, 105B in one direction causes the other pedal to move in an opposite direction.

Figure 5:
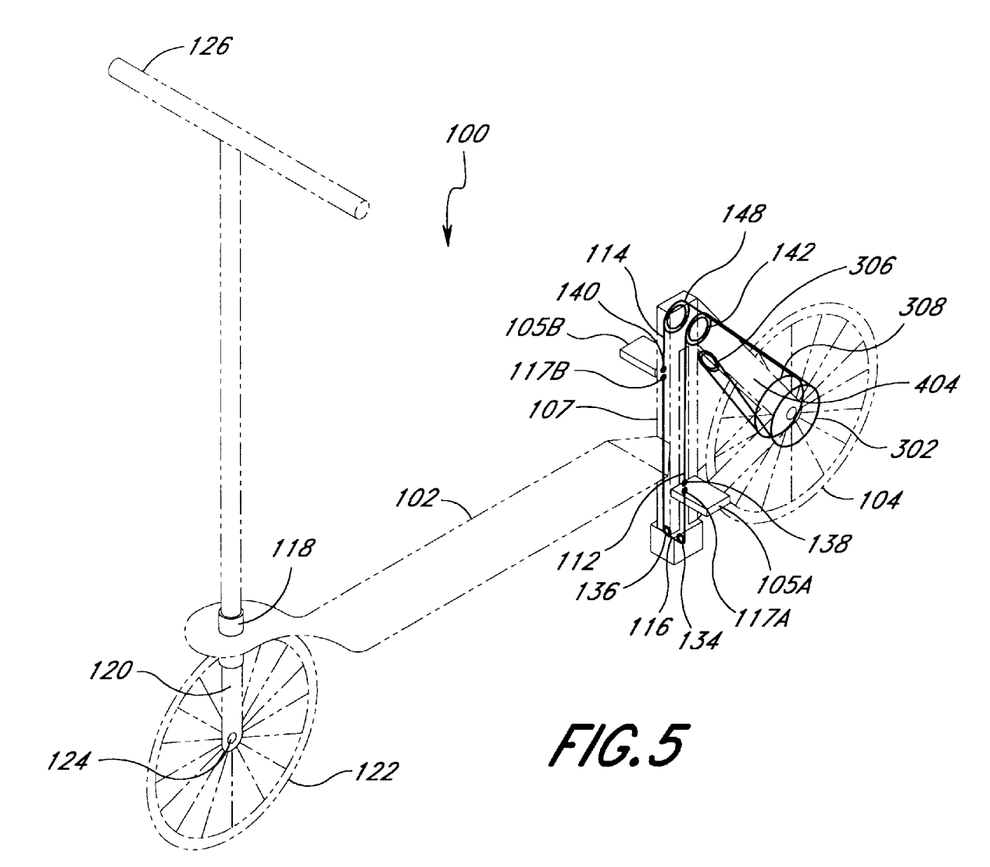
FIG. 5 is a perspective view of an alternative embodiment of the invention wherein two linear tracks are attached to a vehicle at a 90 degree angle in reference to a ground plane.

Referring now to FIG. 5, a scooter using the linear tracks 107 of the present invention is illustrated. The linear tracks 107 are mounted on the frame 102 in an approximately vertical position in relation to the ground plane. For purposes of simplicity, only the differences between FIG. 5 and FIG. 1 are noted. The vehicle 100 of FIG. 5 does not include a seat since the rider propels the vehicle 100 from a standing position. Similar to the embodiment of the invention disclosed in FIG. 1, each of the ends 138, 140 of the power transmitter 110 are connected to one of the pedals 105A, 105B.

Still referring to FIG. 5, from the pedal 105A, the power transmitter 110 extends to the pulley 142. The pulley 142 guides the power transmitter 110 in a downward direction to a first rotatable driver 302 mounted on a bottom end of the rear wheel support member 404. From the first rotatable driver 302, the power transmitter 110 extends upward and around the pulley 306 which is mounted on a front side of the rear wheel support member 404. The power transmitter 110 then extends downward to a second rotatable driver 308, the second rotatable driver 308 being mounted on the bottom end of the rear wheel support member 404. From the second rotatable driver 308, the power transmitter 110 extends around a pulley 148 and finally connects to the right pedal 105B.

In one embodiment of the invention, the handlebars 126 may be configured to be adjustable to a height which is comfortable to a rider which is standing on the left and right pedals 105A, 105B. It is noted that in other embodiments of the invention, the linear tracks 107 may be mounted at an angle between 0 and 90 degrees in reference to the ground plane.

Figure 6:
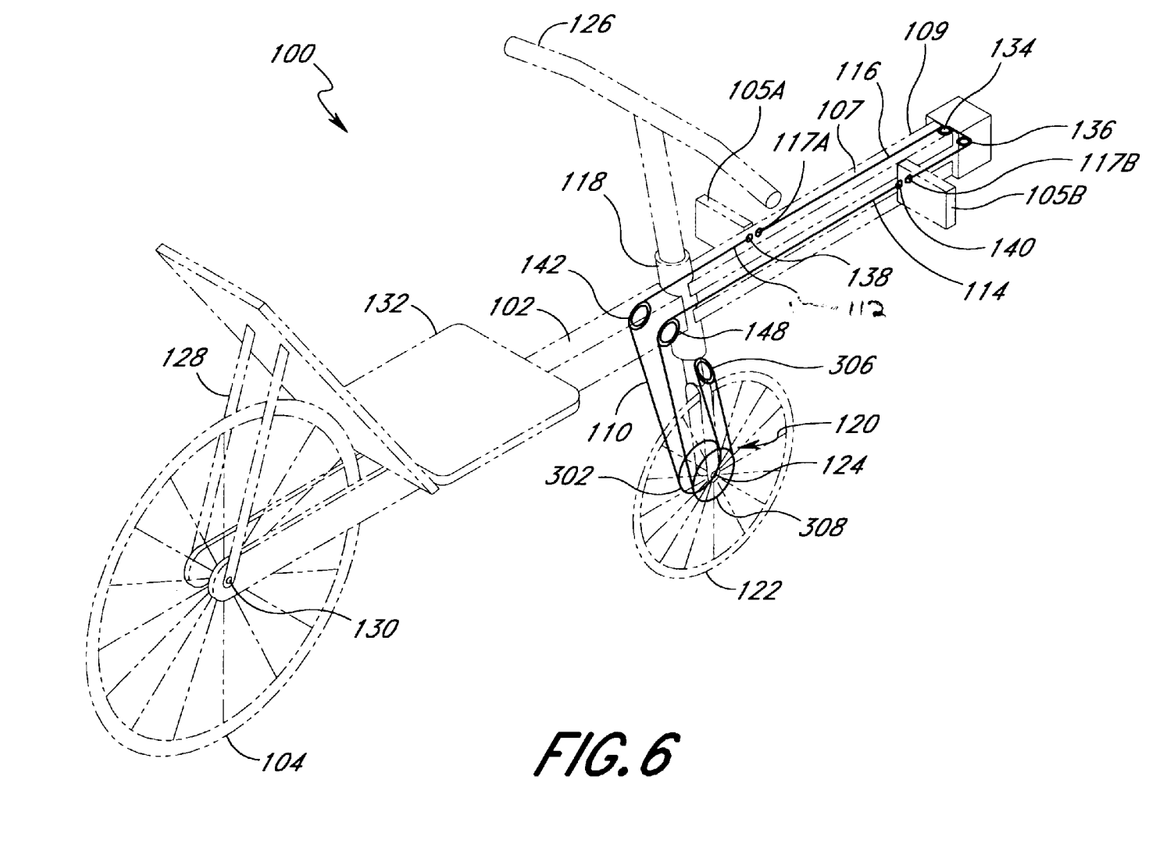
FIG. 6 is a perspective view of an alternative embodiment of the invention wherein a vehicle is configured to provide a front wheel drive.

FIG. 6 illustrates an alternative embodiment of the invention which employs a front wheel drive. Similar to the embodiment illustrated in FIG. 1, the vehicle 100 has linear tracks 107 mounted on the frame 102 in an approximately horizontal position. For purposes of simplicity, only the differences between the embodiment of the invention shown in FIG. 1 are described.

Similar to the embodiment of the invention disclosed in FIG. 1, each of the ends 138, 140 of the power transmitter 110 is connected to one of the pedals 105A, 105B. From the pedal 105A, the power transmitter 10 extends to the pulley 142. The pulley 142 guides the power transmitter 110 in a downward direction to a first rotatable driver 302 mounted on a bottom end of the front fork assembly 120. From the first rotatable driver 302, the power transmitter 110 extends upward and around the pulley 306 which is mounted on a front side of the fork tube 118. The power transmitter 110 then extends downward to a second rotatable driver 308, the second rotatable driver 308 being mounted on the bottom end of the front fork assembly 120. From the second rotatable driver 308, the power transmitter 110 extends around a pulley 148 and finally connects to the right pedal 105B.

In one embodiment of the invention, the first rotatable driver 302 driver and the second rotatable driver 308 each include a one way clutch. The one way clutch may be implemented by using a roller clutch, a pawl and ratchet, a freewheel, or any other conventional drive mechanism that engages in one rotational direction but not the other.

Similar in operation to the embodiment which is shown in FIG. 1, the movement of the power transmitter 110 in the first direction engages the first rotatable driver 302 to drive the front wheel 122 in a forward direction. The movement of the power transmitter 110 in the second direction engages the second rotatable driver 308 to drive the front wheel 122 in a forward direction. Further, each of the pedals 105A, 105B are linked such that the movement of one of the pedals 105A, 105B in one direction causes the other pedal to move in an opposite direction.

Figure 7:
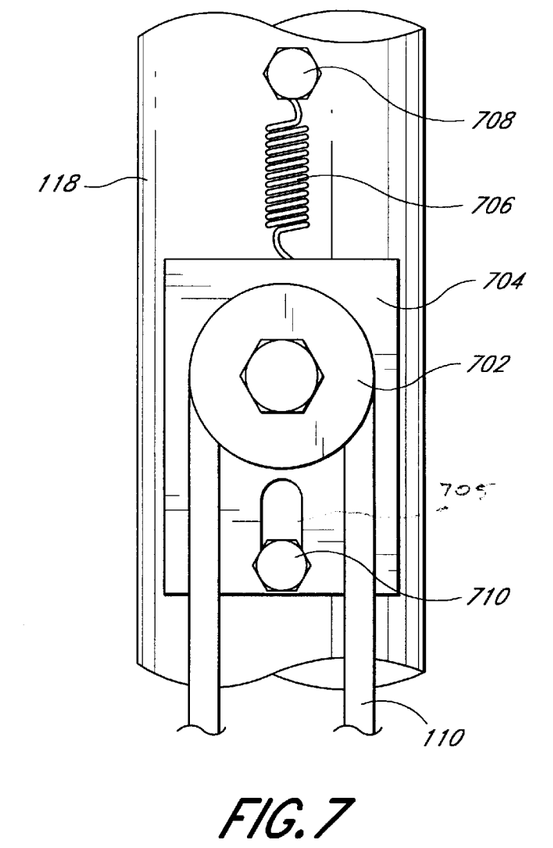
FIG. 7 is a front elevational view of a spring loaded pulley which is used in the embodiment of the invention shown in FIG. 6.

FIG. 7 is a front elevational view of the spring loaded pulley 306 which is shown in FIG. 6. The spring loaded pulley 306 generally includes a pulley 702, a pulley base 704 having an elongated aperture, and a spring 706. The spring 706 is connected at an upper end to the fork tube 118 by a fastening device 708, such as a screw. Opposite to the connection to the fork tube 118, the spring 706 attaches to the pulley base 704. The pulley 702 is slidingly engaged to the pulley base 704 via a slot 705 which is centrally positioned on the pulley base 704 so as to allow the pulley 702 to move in a vertical direction. The spring loaded pulley 306 provides slack to the power transmitter 110 when the front fork assembly 120 is turned to the left or to the right. The pulley base 704 is fastened to the fork tube by a second fastening device 710.

Figure 8:
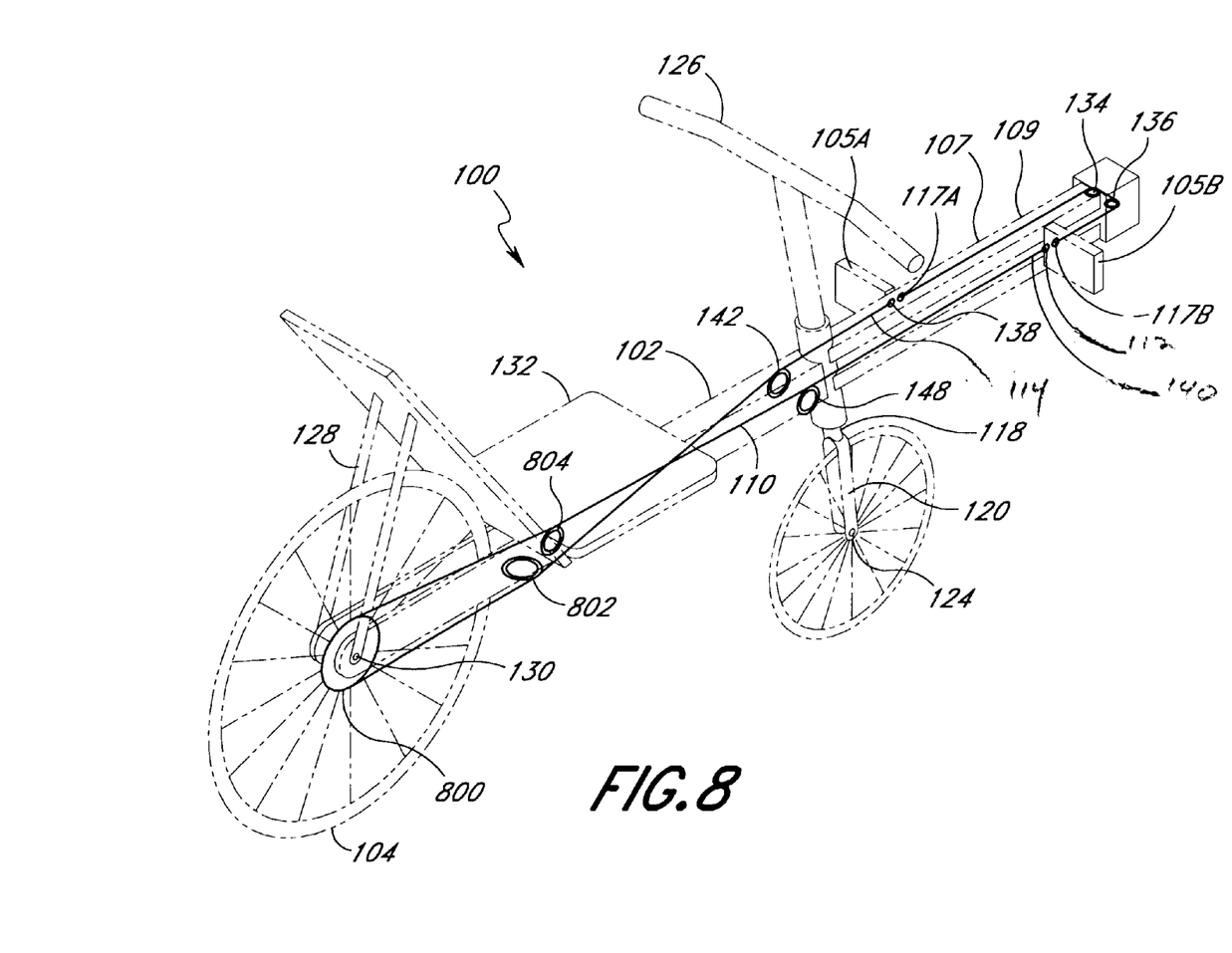
FIG. 8 is a perspective view of an alternative embodiment of the invention employing one rotatable driver to provide a rear wheel drive.

Now referring to FIG. 8, another alternative embodiment of the invention which uses a rotatable driver 800 to drive a wheel in a forward motion upon the movement of the power transmitter 110 is disclosed. Similar to the embodiment illustrated in FIG. 1, the vehicle 100 has linear tracks 107 mounted on the frame 102 in an approximately horizontal position. (As discussed above, positions other than horizontal are also contemplated.) For purposes of simplicity, only the differences between the embodiment of the invention shown in FIG. 1 are described.

Extending from the pulley 142, the power transmitter 110 extends over a pulley 802 which is situated in a horizontal position proximate to the rear of the seat 132. From the pulley 802, the power transmitter 110 extends around the rotatable driver 800 which is rotatably mounted on the wheel mount 130. The power transmitter 110 then extends over a pulley 804 which is mounted to the frame 102 proximate to the underside of the seat 132. From the pulley 804, the power transmitter 110 continues to extend to pulley 148.

The operation of the left and right pedals 105A, 105B in relation to the linear tracks 106 are identical to the embodiment of the invention described in reference to FIG. 1. The movement of the power transmitter 110 in each of the first and second directions causes the rotatable driver 800 to drive the rear wheel 104 in a forward direction.

Figure 9:
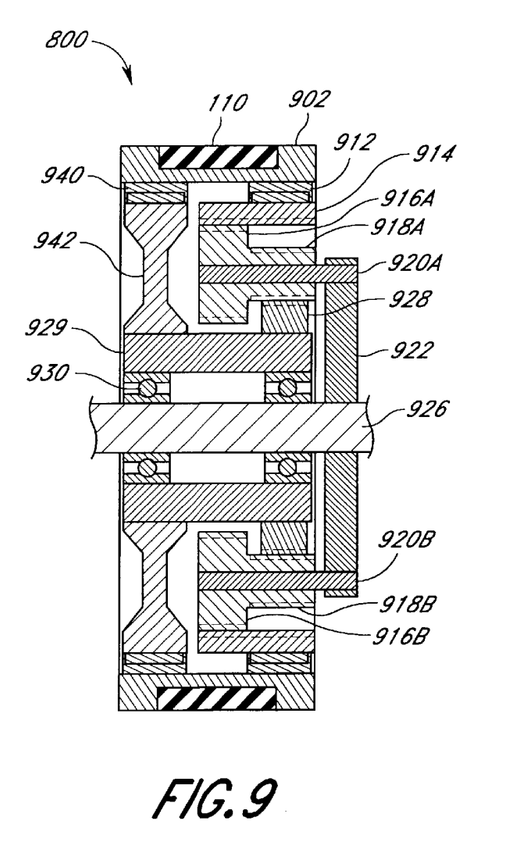
FIG. 9 is a cutaway elevational view of the rotatable driver shown in FIG. 8.
Figure 10:
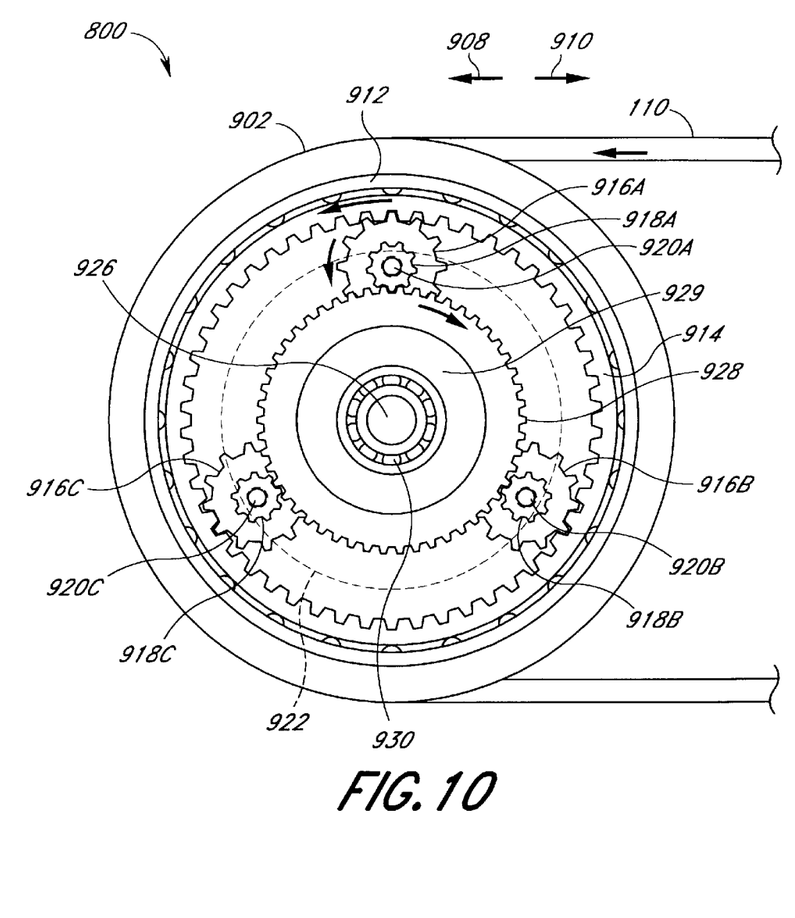
FIG. 10 is a side elevational view of the rotatable driver shown in FIG. 8.

It should be appreciated that the rotatable driver 800 may be implemented using various engaging mechanisms, such as by using multiple roller clutches, conventional freewheels, or by using a pawl and ratchet system. FIGS. 9 and 10 describe in further detail one such embodiment that implements the rotatable driver to include two one way roller clutches.

Referring now to FIGS. 9 and 10, detailed views of the rotatable driver 800 are disclosed. FIG. 9 shows a rear cut-away elevational view of the rotatable driver 800, and FIG. 10 shows a cutaway side elevational view of the rotatable driver 800.

The rotatable driver 800 includes a pulley 902 which is engaged by the power transmitter 110. The rotatable driver 800 includes two driving mechanisms to drive the wheel 104 (FIG. 8) upon the movement of the power transmitter 110 in a first direction 908 and a second direction 910. To be noted, the first direction 908 is generally directed toward a rear portion of the vehicle 100, and the second direction 910 is generally directed toward a forward portion of the vehicle 100.

An outer side of the pulley 902 is coupled to a first one way roller clutch 912. When the pulley 902 rotates in the second direction 910, the first one way roller clutch 912 is disengaged from powering the wheel 104 (FIG. 8). However, when the pulley 902 rotates in the first direction 908, the pulley 902 engages or activates the first one way roller clutch 912. When activated, the first one way roller clutch 912 engages a ring gear 914 having a plurality of teeth on an inner perimeter, the ring gear 914 being located proximate to an inner surface of the first one way roller clutch 912, the inner surface being opposite to the pulley 902. The ring gear 914 is coupled with three large planet gears 916A, 916B, 916C. Each of the large planet gears 916A, 916B, 916C are spaced an equal distance apart from each other on an inner surface of the ring gear 914 which is opposite to the pulley 902.

Each of the large planet gears 916A, 916B, 916C are fixedly coaxially attached to one of three small planet gears 918A, 918B, and 918C. The large planet gear 916A and the small planet gear 918A are each rotationally engaged to a planet gear axle 920A. Similarly, the large planet gear 916B and the small planet gear 918B are rotationally engaged to a planet gear axle 920B. Further, the large planet gear 916C and the small planet gear 918C are rotationally engaged to a planet gear axle 920C. Although only three large planet gears 916A, 916B, 916C and three small planet gears 918A, 918B, 918C are disclosed, the rotatable driver 800 may be adapted to include more or less large and small planet gears.

The planet gear axles 920A, 920B and 920C each extend at a ninety degree angle from a surface of a support disc 922. The support disc 922 is fixed to an axle 926 or frame 102 and is non-rotational.

Each of the three small planets gears 918A, 918B, 918C engage a sun gear 928. The sun gear 928 is fixedly attached to a rotating member 929 which drives the wheel 104 (FIG. 8). On an inner surface of the rotating member 929, the inner surface being opposite the sun gear 928, a plurality of ball bearings 930 are used to facilitate the movement of the rotating member 929.

On a side of the rotatable driver 800 proximate to the wheel 104, a second one way roller clutch 940 is coupled to the inner side of the pulley 902. The second one way roller clutch 940 is adapted to be engaged by the movement of the pulley 902 when the pulley is moved in the second direction 910. The second one way roller clutch 940 is engaged to an outer edge of an annular connecting member 942. At an inner surface of the connecting member 942 opposite to the connection to the second one way roller clutch 940, the connecting member 942 is fixedly attached to the rotating member 929.

As can be seen most clearly in reference to FIG. 10, when the power transmitter 110 is moving in a first direction 908, the power transmitter 110 drives the pulley 902 in a similar direction, and thereby causes a counter-clockwise movement of the pulley 902. The movement of the pulley in a counter-clockwise movement engages the first roller clutch 912 to similarly move in a counter-clockwise direction. Further, the movement of the first one way roller clutch 912 in the counter-clockwise direction engages the large planet gears 916A, 916B, 916C and the small planet gears 918A, 918B, and 918C to rotate in a counter-clockwise direction. The rotation of each of the small planet gears 918A, 918B, and 918C engages the sun gear 928 to rotate in a clock-wise direction. Finally, the sun gear 928 engages the rotating member 929 to drive the wheel 104 (FIG. 8) in a forward motion.

Still referring to FIG. 10, when the power transmitter 110 is moving in a second direction 910, the second one way roller clutch 940 is engaged and rotates in a clockwise direction. The second one way roller clutch 940 engages the connecting member 942 to similarly rotate in a clockwise direction. The rotation of the connecting member 942 in a clockwise direction also causes the rotating member 929 to drive in a clockwise direction. Thus, the wheel 104 (FIG. 8) is driven in a forward motion upon the movement of the power transmitter 110 in the first and second directions 908, 910.

Figure 11:
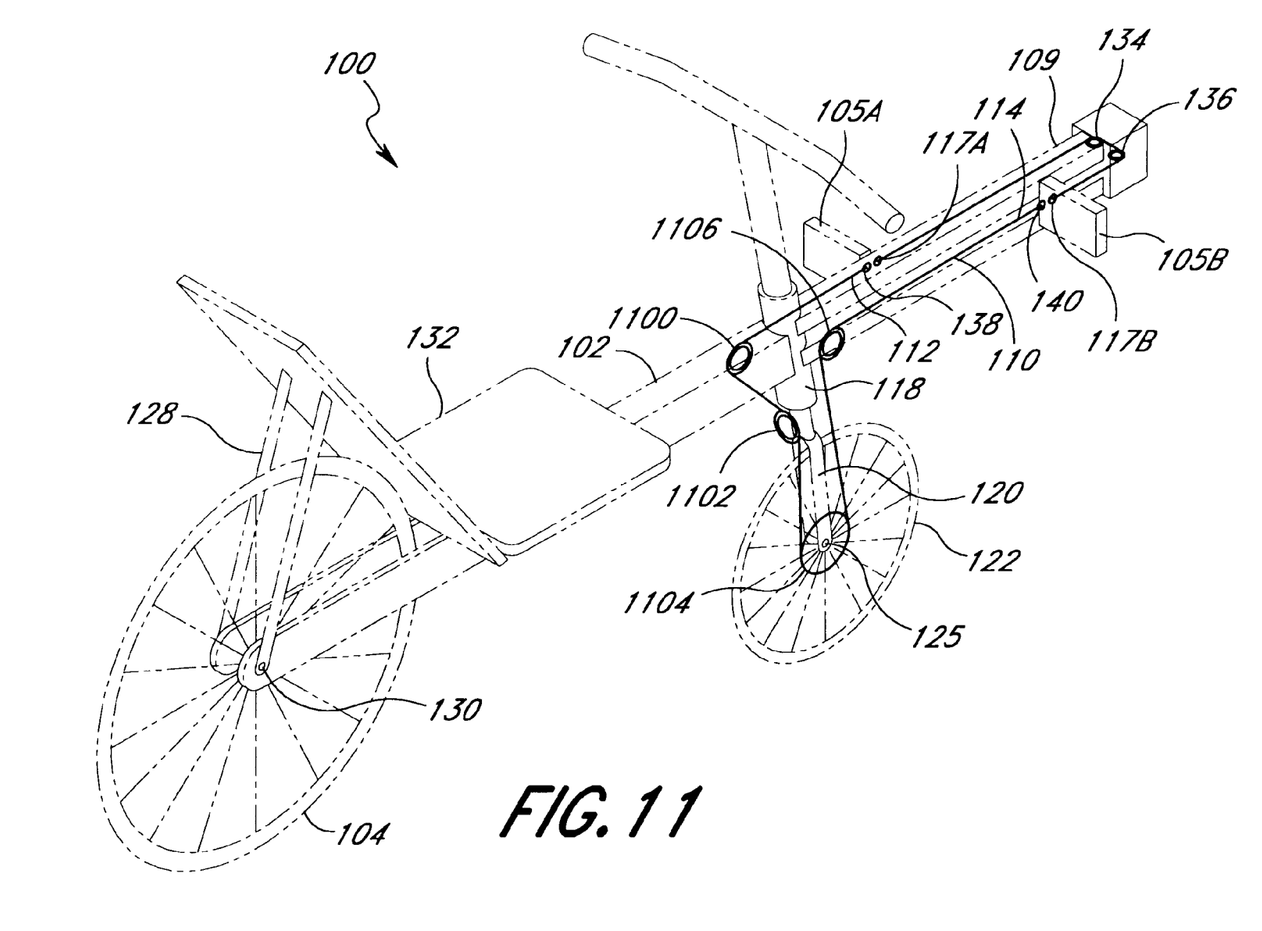
FIG. 11 is a perspective view of an alternative embodiment of the invention employing one rotatable driver to a provide a front wheel drive.

FIG. 11 illustrates yet another embodiment of the invention using a front wheel drive. The power transmitter 110 extends from the first end 138 to a pulley 1100 which is connected to the first side of the vehicle 100 proximate to the fork tube 118. From the pulley 1100, the power transmitter 110 extends to a pulley 1102 which is situated on a back side of the front fork assembly 120. The pulley 1102 guides the power transmitter 110 to a rotatable driver 1104 which is mounted on the bottom end of the front fork assembly 120. The rotatable driver 1104 may be configured similarly to the rotatable driver described in reference to FIGS. 9 and 10, or may alternatively employ a different driving mechanism. From the rotatable driver 1104, the power transmitter 10 extends to a pulley 1106 which is situated on the forward portion 109 of the frame 102 proximate to the fork tube 118. From the pulley 1106, the power transmitter 110 extends to connect to the right pedal 105B.

The rotatable driver 1104 engages the front wheel 122 in a forward direction upon the motion of the power transmitter 110 in the first and second direction. Similar to the rotatable driver 800 of FIG. 8, the rotating member 1104 may be implemented by using two one way roller clutches, such as is described in reference to FIGS. 9 and 10. It is noted, the pulleys 1102 and 1106 may each be configured as a spring loaded pulley such as is shown in FIG. 7.

As can be seen by the foregoing discussion, the linear drive system of the invention solves several problems which are commonly associated with traditional drive solutions. First, the linear drive system of the invention provides a rider with the ability to power the vehicle upon the forward and backward stroke of the vehicle. Furthermore, the stroke of a rider is almost 100% efficient. This is to be contrasted with many rotary drive systems in which only a 30–50% efficiency is achieved. Further, using the linear drive mechanism of the invention, an adjustable length stroke is possible. For example, a rider may want to shorten and quicken the stroke when ascending a hill, and may want to lengthen the stroke when traveling downhill. The great leverage the rider is able to generate in all embodiments produces a faster vehicle with quicker acceleration. The linear drive system utilizes more large leg muscles than rotary drives, activating the hamstrings and gluteals, further increasing speed and acceleration. Finally, the linear drive action is more comfortable and less fatiguing than rotary powered systems.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A machine powered by a user, comprising:
   a frame;
   at least one drive wheel;
   at least one rotatable driver comprising a pulley or a sprocket, rotatably mounted with respect to the frame, which engages with the drive wheel to rotate the drive wheel;
   a flexible, elongated power transmitter comprising a belt, a chain, or a cable, said transmitter being mounted for reciprocating linear motion with respect to the frame and passing around and engaging the rotatable driver to rotate the driver in at least a first rotational direction, said power transmitter having a first portion and a second portion;
   a first pedal fixedly engaging the first portion of the power transmitter; and
   a second pedal fixedly engaging the second portion of the power transmitter, said first and second pedals being mounted to the frame in a manner that permits only non-arcuate, linear reciprocating motion of said pedals with respect to said frame, said second pedal connected to the first pedal such that motion of the first pedal in a first linear direction causes the second pedal in an opposite, second linear direction, and the motion of the first pedal in the second linear direction causes motion of the second pedal in the first linear direction, whereby linear motion of said pedals causes said power transmitter to rotate said rotatable driver and said drive wheel.

2. The machine of claim 1, further comprising first and second one way clutches rotationally coupling one or more of said rotatable drivers to said drive wheel, wherein said first clutch is adapted to engage when said power transmitter moves in a first direction and said second clutch is adapted to engage when said power transmitter moves in a second direction.

3. The machine of claim 2, wherein said clutches are both located on the same side of the drive wheel.

4. The machine of claim 3, further comprising gearing coupling at least one said rotatable driver to said drive wheel through said second clutch, wherein said gearing reverses the rotational direction of said rotatable driver to rotate said drive wheel in a direction opposite to the rotational direction of said rotatable driver.

5. The machine of claim 4, wherein said power transmitter is a belt.

6. The machine of claim 5, wherein said belt is cogged.

7. The machine of claim 4, wherein said clutches are roller clutches.

8. The machine of claim 7, wherein said gearing comprises at least one planet gear driven by said rotatable driver, each said planet gear driving a sun gear that is coupled to said second clutch.

9. The machine of claim 8, wherein each said planet gear is located in a fixed position relative to said frame.

10. The machine of claim 2, wherein said first and second clutches are located on opposite sides of the drive wheel.

11. The machine of claim 10, wherein said power transmitter extends from said first pedal to a first said rotatable driver on a first side of said drive wheel, around said drive wheel to a second rotatable driver on a second side of said drive wheel, and then to said second pedal.

12. The machine of claim 11, wherein said power transmitter is a belt.

13. The machine of claim 12, wherein said belt is cogged.

14. The machine of claim 1, wherein the power transmitter is a roller chain.

15. The machine of claim 1, wherein the power transmitter is a cogged belt.

16. The machine of claim 1, wherein the first and second pedals each travel in a reciprocating path that is substantially horizontal in reference to a ground plane.

17. The machine of claim 1, further comprising a seat having a backrest, the seat affixed to the frame.

18. The machine of claim 17, wherein the seat is situated on substantially a same plane which is formed by the linear motion of the first and second pedals.

19. The machine of claim 1, wherein the first and second pedals each travel in a reciprocating path that is at an angle of between 30 degrees and 90 degrees with reference to a ground plane.

20. The machine of claim 1, wherein the first and second pedals travel in a reciprocating path that is substantially vertical in reference to a ground plane.

21. The machine of claim 20, wherein the machine is a scooter.

22. The machine of claim 1, further comprising a chest rest thereby allowing a user to propel the machine while the user is lying in a prone position.

23. The machine of claim 1, wherein the first and second portions of the belt are located on first and second sides of the frame, respectively.

24. The machine of claim 1, wherein the machine is a bicycle.

25. The machine of claim 24, wherein said drive wheel is a front wheel of the bicycle.

26. The machine of claim 24, wherein said drive wheel is a rear wheel of the bicycle.

27. The machine of claim 1, where said pedals are mounted to posts extending orthogonal to said first and second linear directions and are rotatable about said posts.

28. The machine of claim 1, further comprising a flexible tension member linking said first pedal to said second pedal, wherein said power transmitter extends away from said pedals in one direction and said tension member extends away from said pedals in a second direction, said tension member and said power transmitter together forming a closed loop.

29. The machine of claim 28, wherein said tension member is a cable.

30. The machine of claim 28, wherein said tension member comprises the same material as the power transmitter.

31. A drive system for a human-powered machine, comprising:

a linear track;

a pair of pedals mounted for linear reciprocating motion along said track;

a linkage between said pedals such that upon linear motion of one pedal in one direction the other pedal moves in the opposite direction, and vice versa;

a power transmitter comprising a belt, a cable, or a roller chain, said power transmitter having a first portion fixedly connected to said first pedal and a second portion fixedly connected to said second pedal, said power transmitter mounted for reciprocating movement;

at least one rotatable driver comprising a pulley or a sprocket coupled to said power transmitter such that movement of said power transmitter rotates said driver;

first and second one way clutches, each coupled to one said rotatable driver; and a drive wheel coupled to said one way clutches, such that upon movement of said power transmitter in a first direction, said first one way clutch engages to rotate said drive wheel in a predetermined direction, and upon movement of said power transmitter in a second direction, said second one way clutch engages to rotate said drive wheel in said same predetermined direction.

32. The drive system of claim 31, wherein a first said rotatable driver is coupled to said first one way clutch, and a second said rotatable driver is coupled to said second one way clutch.

33. The drive system of claim 32, wherein said first and second rotatable drivers are located on opposite sides of said drive wheel.

34. The drive system of claim 31, wherein the same rotatable driver drives said first and second one way clutches.

35. The drive system of claim 32, wherein said rotatable driver is directly coupled to said first one way clutch, wherein said system further comprises direction-reversing gearing coupling said rotatable driver to said second one way clutch.

36. The drive system of claim 32, wherein said first and second one way clutches are each roller clutches.

* * * * *